(12) United States Patent  
Erickson

(10) Patent No.: US 9,662,832 B2  
(45) Date of Patent: May 30, 2017

(54) HYBRID STRUCTURE AND METHODS FOR FORMING THE SAME

(71) Applicant: The Boeing Company, Chicago, IL (US)

(72) Inventor: Marcus Alexander Erickson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/183,447

(22) Filed: Jun. 15, 2016

(65) Prior Publication Data

US 2016/0289845 A1    Oct. 6, 2016

Related U.S. Application Data

(62) Division of application No. 13/832,181, filed on Mar. 15, 2013, now Pat. No. 9,393,761.

(51) Int. Cl.
*B29C 65/00* (2006.01)
*B29C 65/02* (2006.01)
(Continued)

(52) U.S. Cl.
CPC ........ *B29C 66/02242* (2013.01); *B29C 65/48* (2013.01); *B29C 65/483* (2013.01);
(Continued)

(58) Field of Classification Search
CPC . B29C 66/9592; B29C 66/721; B29C 66/729; B29C 66/73; B29C 66/731; B29C 66/7314; B29C 65/00; B29C 65/48; B29C 65/486; B29C 65/50; B29C 65/5007; B29C 65/5021; B29C 70/24; B29C 65/712; B29C 65/7212; B29C 65/742; B32B 38/04; B32B 38/047; B32B 27/00; B32B 27/04;
(Continued)

(56) References Cited

U.S. PATENT DOCUMENTS 4,478,915 A    10/1984    Poss et al.
2007/0175966 A1    8/2007    Barnes
(Continued)

FOREIGN PATENT DOCUMENTS

EP    0660774 B1    11/1997
EP    2434105 A2    3/2012
(Continued)

OTHER PUBLICATIONS

Canada Office Action for related application 2,839,334 dated May 7, 2015; 5 pp.
(Continued)

*Primary Examiner* — Philip Tucker
*Assistant Examiner* — Brian R Slawski
(74) *Attorney, Agent, or Firm* — Armstrong Teasdale LLP

(57) ABSTRACT

A method for forming a hybrid structure is provided. The method includes applying a sealant to a first component fabricated from a first material, coupling an isolation sheet to the sealant, and coupling a second component to the isolation sheet. The isolation sheet and the second component are fabricated from a second material that is different than the first material to facilitate preventing formation of a galvanic cell within the hybrid structure.

10 Claims, 3 Drawing Sheets

(51) Int. Cl.

| | |
|---|---|
| *B32B 37/00* | (2006.01) |
| *B32B 38/00* | (2006.01) |
| *B32B 7/08* | (2006.01) |
| *B32B 38/04* | (2006.01) |
| *C09J 7/00* | (2006.01) |
| *B32B 3/06* | (2006.01) |
| *B32B 3/00* | (2006.01) |
| *B32B 9/00* | (2006.01) |
| *B32B 15/08* | (2006.01) |
| *B32B 27/38* | (2006.01) |
| *B32B 15/00* | (2006.01) |
| *B32B 17/06* | (2006.01) |
| *B32B 15/04* | (2006.01) |
| *C03C 27/00* | (2006.01) |
| *C03C 29/00* | (2006.01) |
| *B32B 17/10* | (2006.01) |
| *B32B 37/16* | (2006.01) |
| *B29C 65/48* | (2006.01) |
| *B29C 65/56* | (2006.01) |
| *B29C 65/72* | (2006.01) |
| *F16B 33/00* | (2006.01) |
| *C23F 13/10* | (2006.01) |
| *B32B 3/26* | (2006.01) |
| *B32B 5/26* | (2006.01) |
| *B32B 7/12* | (2006.01) |
| *B32B 15/14* | (2006.01) |
| *C23F 11/08* | (2006.01) |
| *F16J 15/02* | (2006.01) |
| *B29L 31/30* | (2006.01) |

(52) U.S. Cl.
CPC ............ *B29C 65/562* (2013.01); *B29C 65/72* (2013.01); *B29C 66/1122* (2013.01); *B29C 66/472* (2013.01); *B29C 66/7212* (2013.01); *B29C 66/7314* (2013.01); *B29C 66/742* (2013.01); *B32B 3/266* (2013.01); *B32B 5/26* (2013.01); *B32B 7/08* (2013.01); *B32B 7/12* (2013.01); *B32B 15/14* (2013.01); *B32B 17/1055* (2013.01); *B32B 37/16* (2013.01); *C23F 11/08* (2013.01); *C23F 13/10* (2013.01); *F16B 33/008* (2013.01); *F16J 15/02* (2013.01); *B29C 66/32* (2013.01); *B29C 66/712* (2013.01); *B29C 66/7422* (2013.01); *B29L 2031/3002* (2013.01); *B29L 2031/3076* (2013.01); *B32B 15/08* (2013.01); *B32B 2250/03* (2013.01); *B32B 2262/101* (2013.01); *B32B 2262/106* (2013.01); *B32B 2307/712* (2013.01); *B32B 2605/18* (2013.01); *Y10T 156/10* (2015.01)

(58) Field of Classification Search
CPC ......... B32B 3/266; B32B 15/14; B32B 15/08; B32B 2262/106; C09J 5/00
USPC ......... 156/60, 64, 71, 91, 92, 250, 252, 253, 156/285, 286, 307.1, 307.3, 307.5, 307.7, 156/313; 428/544, 596, 614, 615, 621, 428/622, 623, 624, 625, 626, 650, 98, 99, 428/131, 137, 189, 221, 223, 299.1, 428/299.4, 411.1, 426, 432, 433
See application file for complete search history.

(56) References Cited

U.S. PATENT DOCUMENTS

| | | | |
|---|---|---|---|
| 2008/0023585 A1 | 1/2008 | Kordel et al. | |
| 2012/0067247 A1* | 3/2012 | Umebayashi | ........ B61D 17/005 |
| | | | 105/396 |

FOREIGN PATENT DOCUMENTS

| | | | | |
|---|---|---|---|---|
| JP | WO 2010143365 A1 | * | 12/2010 | ......... B61D 17/005 |
| JP | 2011042030 A | | 3/2011 | |
| WO | 2004067796 A1 | | 8/2004 | |
| WO | 2008156933 A2 | | 12/2008 | |
| WO | 2010143365 A1 | | 12/2010 | |

OTHER PUBLICATIONS

EP Extended European Search Report for related matter 14156151.4 dated Nov. 14, 2014; 9 pp.
Design for Corrosion Control, Aero No. 07, The Boeing Company, available at http://www.boeing.com/commercial/aeromagazine/ aero_07/ corrosn.html, last visited Jan. 11, 2013.

* cited by examiner

HYBRID STRUCTURE AND METHODS FOR FORMING THE SAME

CROSS-REFERENCE TO RELATED APPLICATIONS

This application is a divisional and claims priority to U.S. patent application Ser. No. 13/832,181 filed Mar. 15, 2013 for "HYBRID STRUCTURE AND METHODS FOR FORMING THE SAME", which is hereby incorporated by reference in its entirety.

BACKGROUND

The present disclosure relates generally to hybrid structures and, more specifically, to methods for use in reducing galvanic corrosion within hybrid structures.

Galvanic corrosion refers to an electrochemical process where in electrons are transferred between materials in electrical contact that have different electrode potentials. A galvanic cell generally includes an anode, a cathode, and an electrolyte that couples the anode and cathode together in electrical contact. During operation, electrons from the material with the more active electrode potential (i.e., the anode) are transferred to the material with the less active electrode potential (i.e., the cathode) via the electrolyte. As such, corrosion occurs when the anode material dissolves in the electrolyte and deposits on the cathode.

Recently, at least some known aircraft components have increasingly been fabricated from composite materials such as carbon-fiber-reinforced polymer (CFRP) in combination with metallic materials such as aluminum, titanium, and/or steel. As used herein, the term "metallic" may refer to a single metallic material or a metallic alloy material. The composite materials generally reduce the weight of the aircraft resulting in an increase in the fuel efficiency of the aircraft. In such assemblies, certain metallic materials have a more active electrode potential than the conductive carbon fibers dispersed within the composite materials.

In at least some known aircraft assemblies, metallic components are coupled to CFRP components via a plurality of fasteners. In one known assembly, CFRP-metallic hybrid structures are formed in a process where the metallic components are aligned with the CFRP parts in a predetermined position, and hole locations are drilled based on the predetermined position. The metallic component is then coupled to the CFRP components with fasteners. In such structures, galvanic corrosion may occur if moisture is introduced between the metallic and CFRP components.

Preventing galvanic corrosion generally requires either eliminating and/or suppressing at least one of the elements of the galvanic cell. When the electrolyte is water, one known method to prevent galvanic corrosion is to apply a water resistant sealant between the anode and cathode to substantially prevent the ingress of the electrolyte therebetween. When forming CFRP-metallic hybrid structures, the sealant is generally applied after the hole locations have been determined, which requires the metallic component to be removed in an intermediate step. However, the process described above that includes alignment of the metallic components, fastener hole formation, removal of the metallic components, sealant application, and re-alignment of the metallic components is an inefficient and time-consuming task, and changes in the ambient conditions after the holes have been formed may cause the parts to distort making re-alignment of holes in the metallic parts with the drill holes difficult.

BRIEF DESCRIPTION

In one aspect, a method for forming a hybrid structure is provided. The method includes applying a sealant to a first component fabricated from a first material, coupling an isolation sheet to the sealant, and coupling a second component to the isolation sheet. The isolation sheet and the second component are fabricated from a second material that is different than the first material to facilitate preventing formation of a galvanic cell within the hybrid structure.

In another aspect, a method for use in forming an assembly is provided. The method includes forming a sub-assembly, installing the sub-assembly in the assembly, and coupling a second component to the sub-assembly at the isolation sheet. The sub-assembly includes a first component fabricated from a first material, a sealant applied to the first component, and an isolation sheet coupled to the sealant. The isolation sheet and the second component are fabricated from a second material that is different than the first material.

In yet another aspect, a hybrid structure is provided. The hybrid structure includes a first component fabricated from a first material, a sealant applied to the first component, an isolation sheet coupled to the sealant, and a second component coupled to the isolation sheet. The isolation sheet and the second component are fabricated from a second material that is different than the first material.

DETAILED DESCRIPTION

The present disclosure relates to hybrid structures fabricated from components of different materials, and methods for forming hybrid structures to facilitate preventing galvanic corrosion of the components therein. The hybrid structures described herein include a sub-assembly formed from a first component fabricated from a first material, a sealant applied to the first component, and an isolation sheet fabricated from a second material that is coupled to the sealant. A second component fabricated from the second material is coupled to the isolation sheet to form the hybrid structure. In the exemplary implementation, the first material and the second material have different electrode potentials such that galvanic corrosion may occur if the second component were directly coupled to the first component in the presence of an electrolyte. As such, in the exemplary implementation, the sealant and the isolation sheet facilitate separating the first component from the second component to substantially prevent the formation of a galvanic cell in the hybrid structure.

In some implementations, the sub-assembly described herein may be fabricated and installed in an assembly, and the second component may then be coupled to the sub-assembly. More specifically, in some implementations, the second component may be coupled to the sub-assembly by aligning the second component with the sub-assembly, determining drill hole locations in the sub-assembly based on holes defined in the second component and/or with a drill jig, and coupling the second component to the sub-assembly with fasteners. Because the sealant and isolation sheet are pre-installed in the sub-assembly, the second component does not need to be removed from alignment after the drill hole locations are determined, and a sealant does not need to be applied to the first component after removal of the second component. As such, manufacturing times may be substantially reduced and difficulties resulting from temperature distortion in the drilled parts may be substantially eliminated as compared to other known manufacturing processes.

Figure 1:
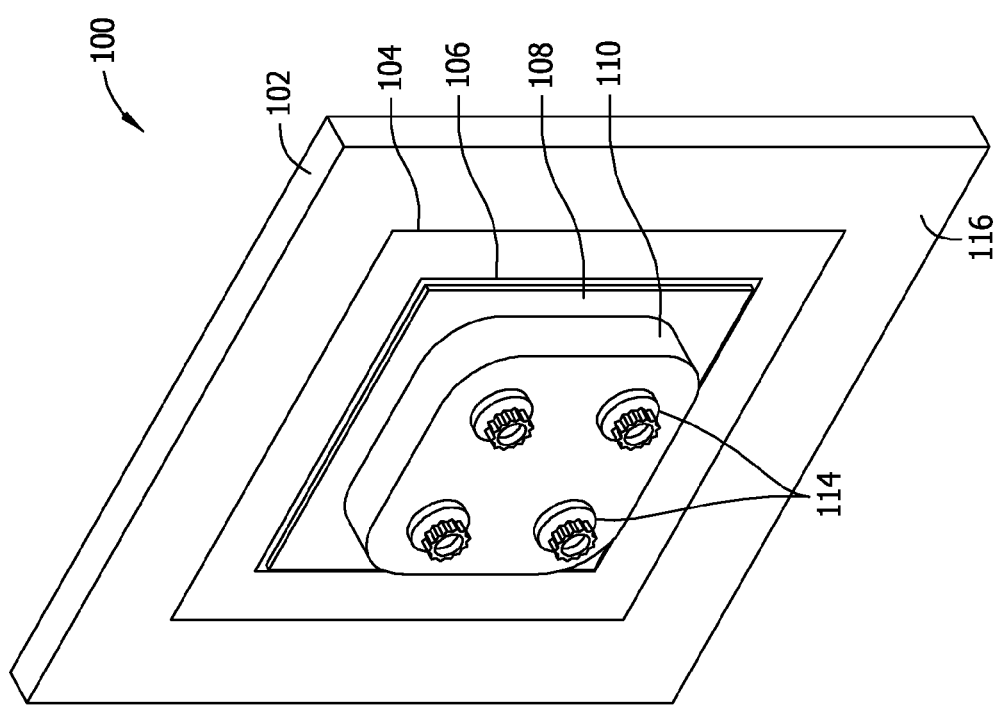
FIG. 1 is a perspective view of an exemplary hybrid structure.

FIG. 1 is a perspective view of an exemplary hybrid structure 100. In the exemplary implementation, hybrid structure 100 includes a first component 102, an isolating layer 104, a sealant 106 applied to isolating 104, an isolation sheet 108 coupled to sealant 106, and a second component 110 coupled to isolation sheet 108. As such, second component 110 is separated from first component 102 by isolation sheet 108, sealant 106, and in some implementations, isolating layer 104 such that galvanic corrosion is facilitated to be prevented.

First component 102, second component 110, and isolation sheet 108 may be fabricated from any suitable material that enables hybrid structure 100 to function as described herein. In some implementations, first component 102 is fabricated from a first material having a first electrode potential, and second component 110 and isolation sheet 108 are fabricated from a second material having a second electrode potential that is different than the first electrode potential. For example, in the exemplary implementation, the difference between the first and second electrode potentials would enable galvanic corrosion to occur if first component 102 and second component 110 were coupled directly to each other in the presence of an electrolyte (not shown). For example, in some implementations, the first material is a carbon fiber material and the second material is a metallic material. Exemplary first materials include, but are not limited to, carbon-fiber-reinforced polymer (CFRP) and a titanium material, and an exemplary second material includes, but is not limited to, an aluminum material. In the exemplary implementation, the first material is a carbon-fiber-reinforced polymer (CFRP) and the second material is an aluminum alloy.

At least some known materials have different levels of electrode potentials that position each material in varying positions on the Anodic index. The Anodic index is used to determine the likelihood of a material to be anodic or cathodic based on the electrode potential of each material used in a galvanic cell. Generally, materials having a less active electrode potential are more likely to be cathodic, and materials having a more active electrode potential are more likely to be anodic. Further, the larger the difference in electrode potential between two materials, the more likely it is for galvanic corrosion to occur if the materials are used in the presence of an electrolyte. In alternative implementations, any first and second materials that have differing electrode potentials may be used to fabricate hybrid structure 100 as described herein.

As described above, materials having different electrode potentials are used to fabricate hybrid structure 100. As such, sealant 106 and isolating layer 104 are used to facilitate preventing galvanic corrosion from occurring within hybrid structure 100. For example, in the exemplary implementation, sealant 106 and isolating layer 104 facilitate preventing galvanic corrosion between isolation sheet 108 and first component 102 by substantially preventing the ingress of moisture therebetween. Further, galvanic corrosion is substantially prevented between isolation sheet 108 and second component 110 because they are fabricated from materials that have substantially similar electrode potentials. As such, in such an implementation, galvanic corrosion would not occur between isolation sheet 108 and second component 110 even if an electrolyte were introduced therebetween.

In the exemplary implementation, sealant 106 may include any suitable material that enables hybrid structure 100 to function as described herein. For example, in the exemplary implementation, sealant 106 has moisture resistance properties that facilitate substantially preventing the ingress of moisture between first component 102 and isolation sheet 108. Further, curing sealant 106 facilitates coupling isolation sheet 108 to first component 102. Exemplary sealant materials include, but are not limited to, a polysulfide material. In some implementations, sealant 106 is fabricated from commercially available aerospace integral fuel tank sealant. For example, the sealant material may have elastomeric properties that don't degrade when exposed to fuel and/or hydraulic fluids, may cure at ambient conditions, may have a service temperature range of between about −65° F. (−54° C.) and 275° F. (135° C.), and may have biocidal properties.

In the exemplary implementation, isolating layer 104 is coupled to a surface 116 of first component 102. In an alternative implementation, isolating layer 104 may be omitted from hybrid structure 100, and sealant 106 may then be applied directly to first component 102. Isolating layer 104 may be fabricated from any suitable material that facilitates preventing galvanic corrosion from occurring within hybrid structure 100. An exemplary material that may be used to fabricate isolating layer 104 includes, but is not limited to, a fiberglass material. For example, in the exemplary implementation, isolating layer 104 is fabricated from a fiberglass material. In some implementations, the electrode potential of the material used to fabricate isolating layer 104 may not be relevant to facilitating preventing formation of a galvanic cell in hybrid structure 100.

In the exemplary implementation, second component 110 has a smaller area than isolation sheet 108, isolation sheet 108 has a smaller area than the applied sealant 106, the applied sealant 106 has a smaller area than isolating layer 104, and isolating layer 104 has a smaller area than first component 102. Moreover, each component of hybrid structure 100 is substantially aligned to ensure second component 110 is physically and/or galvanically separated from first component 102. As such, second component 110 is substantially prevented from being directly coupled to first component 102 and thus, formation of a galvanic cell within hybrid structure 100 is substantially prevented.

Figure 2:
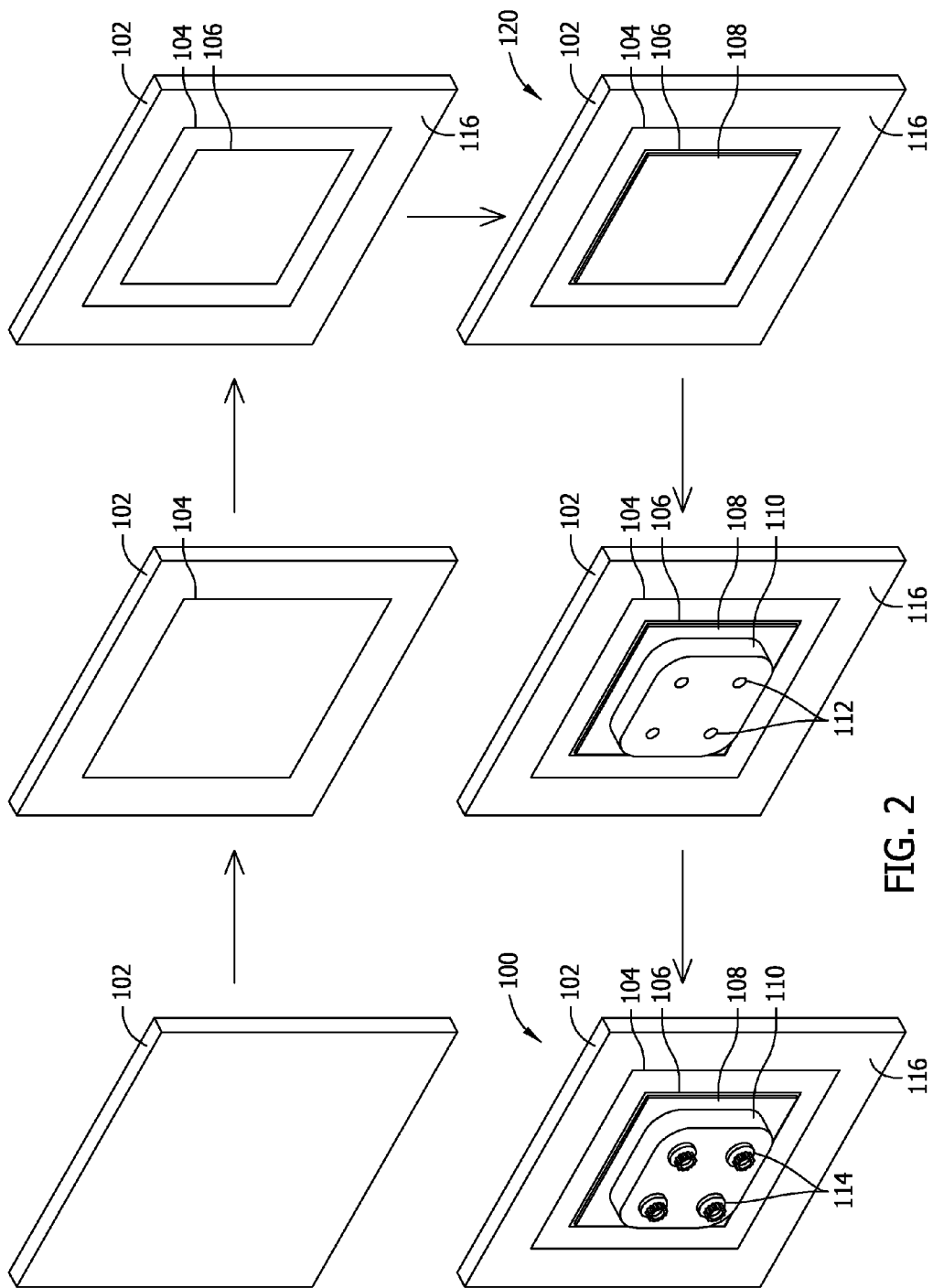
FIG. 2 is illustrates a series of assembly steps for forming the hybrid structure shown in FIG. 1.

FIG. 2 is illustrates a series of assembly steps for forming hybrid structure 100. As illustrated, first component 102 is provided and isolating layer 104 is coupled to first component 102. For example, in the exemplary implementation, first component 102 is fabricated from CFRP, and isolating layer 104 is positioned on surface 116 of first component 102. Sealant 106 is then applied directly to isolating layer 104 and thus indirectly to first component 102. In an alternative implementation, hybrid structure 100 does not include isolating layer 104, and sealant 106 may be applied directly to surface 116 of first component 102.

Isolation sheet 108 is then applied to sealant 106 and pressure is applied to isolation sheet 108 to remove excess sealant 106 from between isolation sheet 108 and first component 102. Pressure may be applied to isolation sheet 108 by any suitable method such as, but not limited to, a mechanical clamping method, and a vacuum bagging method. Applying pressure to isolation sheet 108 also enables sealant 106 to fill microvoids (not shown) defined within surfaces of isolation sheet 108 and first component 102, which substantially prevents the ingress of moisture between isolation sheet 108 and first component 102. Pressure is applied to isolation sheet 108 while sealant 106 cures, which enables isolation sheet 108 to be coupled to first component 102. In some implementations, first component 102, isolating layer 104, sealant 106, and isolation sheet 108 may form a sub-assembly 120, which may be installed in any suitable assembly (not shown) before second component 110 is coupled to isolation sheet 108. An exemplary assembly includes, but is not limited to, an aircraft assembly, where sub-assembly 120 may be installed as part of a carbon fiber fuselage and second component 110 may be a wing portion of the aircraft assembly.

After isolation sheet 108 has been coupled to first component 102 with sealant 106, second component 110 may be aligned with isolation sheet 108 in a predetermined position. In the exemplary implementation, second component 110 includes a plurality of holes 112 defined therein. When second component 110 is aligned with isolation sheet 108 in the predetermined position, holes 112 may be used to determine bore hole locations (not shown) in isolation sheet 108 based on the position of holes 112 defined in second component 110. In an alternative implementations, the bore hole locations may be determined using a drill jig. Bore holes may then be defined in sub-assembly 120 at the determined bore hole locations using any suitable method such as, but not limited to, drilling.

In some implementations, second component 110 is substantially maintained in the predetermined position while bore holes are drilled in sub-assembly 120. Fasteners 114 may then be inserted through holes 112 and the bore holes defined in sub-assembly 120 to couple second component 110 to isolation sheet 108. In some implementations, fasteners 114 are installed using a wet installation. As used herein, the term "wet installation" refers to a process of applying a sealant either to fasteners 114 during installation and/or to each bore hole before inserting a fastener 114 therethrough. Wet installation substantially prevents the ingress of moisture between fasteners 114 and the components of sub-assembly 120 to substantially prevent galvanic corrosion from occurring within hybrid structure 100.

Figure 3:
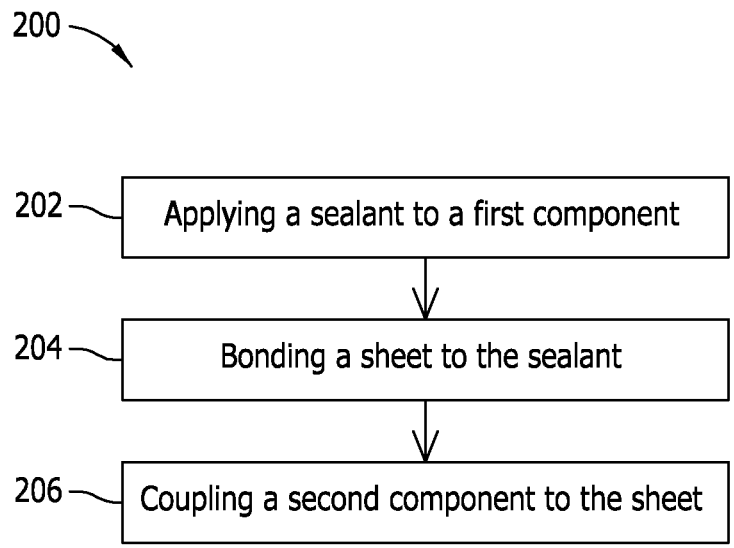
FIG. 3 is a flow diagram of an exemplary method for forming the hybrid structure shown in FIG. 1.

FIG. 3 is a flow diagram of an exemplary method 200 for use in forming a hybrid structure, such as structure 100. In the exemplary implementation, a sealant is applied 202 to a first component, such as component 102, and an isolation sheet, such as isolation sheet 108, is then coupled 204 to the sealant, such as sealant 106. In some implementations, the sealant may be cured to facilitate bonding the isolation sheet to the first component. The second component, such as component 110, is then coupled 206 to the isolation sheet. In the exemplary implementation, the first component is fabricated from a first material and the isolation sheet and the second component are fabricated from a second material.

In some implementations, the second component is coupled 206 to the isolation sheet by aligning the second component in a predetermined orientation, and determining bore hole locations on the isolation sheet based on holes defined in the second component. Bore holes may then be formed through the isolation sheet, the sealant, and the first component at the desired hole locations, and at least one fastener may be used to couple 206 the second component to the isolation sheet. For example, the at least one fastener may be inserted through the holes defined in the second component and the formed bore holes to couple 206 the second component to the isolation sheet.

Figure 4:
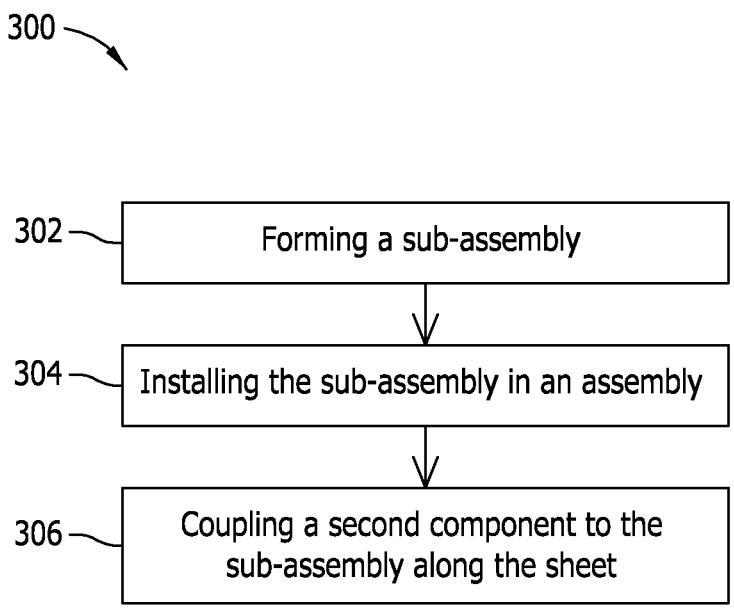
FIG. 4 is a flow diagram of an exemplary method that may be completed to form an assembly that may be used with the hybrid structure shown in FIG. 1.

FIG. 4 is a flow diagram of an exemplary method 300 that may be implemented to form an assembly, such as an aircraft assembly. In the exemplary implementation, a sub-assembly, such as sub-assembly 120, is formed 302 and and installed 304 in the assembly. After the sub-assembly is installed 304 in the assembly, the second component, such as component 110, is then coupled 306 to the sub-assembly.

In some implementations, the sub-assembly is installed 304 as part of an aircraft assembly. In the exemplary implementation, the sub-assembly includes a first component, such as component 102, that is fabricated from a carbon fiber material, and the second component coupled 306 to the sub-assembly is fabricated from a metallic material. Moreover, in some implementations, the second component is coupled 306 to the sub-assembly by aligning the second component in a predetermined orientation, and determining bore hole locations in the sub-assembly based on holes defined in the second component. Bore holes may then be formed through the sub-assembly at the desired hole locations, and at least one fastener may be used to couple 306 the second component to the sub-assembly. As described above, a sealant and an isolation sheet are pre-installed in the sub-assembly, and the second component does not need to be removed from alignment after the bore hole locations are determined. As such, coupling 306 the second component to the sub-assembly may be simplified, which may be useful in processes that include fabricating structures of increasing sizes.

The hybrid structures and associated methods of forming described herein substantially prevent galvanic corrosion from occurring within the hybrid structure. More specifically, components of the hybrid structure are fabricated from materials having different electrode potentials. First and second components of the hybrid structure remain separated within the completed structure by the isolating layer, the sealant, and the isolation sheet. As such, even in the presence of an electrolyte such as moisture, the isolating layer, the sealant, and the isolation sheet substantially prevent a galvanic cell from being formed within the hybrid structure. Further, in some implementations, the first component, the isolating layer, the sealant, and the isolation sheet may be formed into a sub-assembly that is then installed in an assembly. The second component may then be coupled to the sub-assembly after installation of the sub-assembly. Post-installation coupling of the second component to the sub-assembly may facilitate reducing manufacturing times for assemblies that use the hybrid structure described herein. Moreover, difficulties associated with temperature distortion and fastener installation may be substantially prevented in applications that require installation of a large number of fasteners.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hybrid structure comprising:
a first component fabricated from a first material;
a sealant applied to said first component;
an isolation sheet coupled to said sealant, wherein said isolation sheet is fabricated from a second material that is different than the first material; and
a second component coupled to said isolation sheet, wherein said second component is fabricated from the second material, wherein the first material has an electrode potential that is different than an electrode potential of the second material, and wherein the first material comprises a carbon fiber material and the second material comprises a metallic material.

2. The structure in accordance with claim 1 further comprising an isolating layer fabricated from a third material and coupled to said first component, wherein said sealant is applied to said isolating layer.

3. The structure in accordance with claim 2, wherein the third material comprises a fiberglass material.

4. The structure in accordance with claim 1, wherein said sealant comprises a polysulfide material.

5. The structure in accordance with claim 1, wherein at least one bore hole is formed in said first component and said isolation sheet, said second component coupled to the isolation sheet with a fastener at said at least one bore hole.

6. The structure in accordance with claim 5 further comprising a second sealant applied within said at least one bore hole such that the ingress of moisture is restricted between the fastener and the hybrid structure.

7. The structure in accordance with claim 1, wherein said sealant is configured to prevent the ingress of moisture between said first component and said isolation sheet.

8. The structure in accordance with claim 1, wherein said sealant has elastomeric and biocidal properties.

9. The structure in accordance with claim 1, wherein said sealant is applied over a first surface area of said first component, said isolation sheet having a second surface area less than the first surface area and aligned with said sealant such that said isolation sheet is physically separated from said first component.

10. The structure in accordance with claim 9, wherein said second component has a third surface area less than the second surface area of said isolation sheet, said second component aligned with said isolation sheet such that said second component is physically separated from said first component.

* * * * *